United States Patent
Kato

(10) Patent No.: US 10,526,459 B2
(45) Date of Patent: Jan. 7, 2020

(54) DIP-FORMED ARTICLE AND METHOD OF PRODUCTION OF DIP-FORMED ARTICLE

(71) Applicant: ZEON CORPORATION, Tokyo (JP)

(72) Inventor: Shinji Kato, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 32 days.

(21) Appl. No.: 15/119,873

(22) PCT Filed: Mar. 24, 2015

(86) PCT No.: PCT/JP2015/058901
§ 371 (c)(1),
(2) Date: Aug. 18, 2016

(87) PCT Pub. No.: WO2015/146974
PCT Pub. Date: Oct. 1, 2015

(65) Prior Publication Data
US 2017/0058086 A1    Mar. 2, 2017

(30) Foreign Application Priority Data
Mar. 26, 2014   (JP) .................................. 2014-063651

(51) Int. Cl.
*C08J 5/02* (2006.01)
*C08J 7/06* (2006.01)
*B05D 1/18* (2006.01)

(52) U.S. Cl.
CPC  *C08J 5/02* (2013.01); *B05D 1/18* (2013.01); *C08J 7/065* (2013.01); *C08J 2313/02* (2013.01)

(58) Field of Classification Search
CPC ................ C08J 5/02; C08J 7/065; B05D 1/18
USPC ....................................................... 428/220
See application file for complete search history.

(56) References Cited

U.S. PATENT DOCUMENTS

| | | | |
|---|---|---|---|
| 6,391,409 B1 * | 5/2002 | Yeh ....................... | B29C 41/003 2/161.7 |
| 6,764,731 B2 | 7/2004 | Savoca et al. | |
| 6,918,987 B2 * | 7/2005 | Halladay ................. | C08J 7/126 106/287.14 |
| 2003/0050377 A1 | 3/2003 | Hagiwara et al. | |
| 2003/0138579 A1 | 7/2003 | Savoca et al. | |
| 2004/0157983 A1 | 8/2004 | Halladay et al. | |

FOREIGN PATENT DOCUMENTS

| | | | |
|---|---|---|---|
| CN | 1747989 A | | 3/2006 |
| JP | S56-63432 A | | 5/1981 |
| JP | S60-108438 A | | 6/1985 |
| JP | 2004-300386 A | | 10/2004 |
| JP | 2004300386 A | * | 10/2004 |
| JP | 2004-352808 A | | 12/2004 |
| WO | 01/053388 A1 | | 7/2001 |

OTHER PUBLICATIONS

Machine English Translation_JP_2004300386_A; Kodama, Kazumi; Latex Composition and Dip-Formed Article; Oct. 28, 2004; JPO; whole document.*
Jun. 23, 2015 International Search Report issued in International Patent Application No. PCT/JP2015/058901.
Sep. 27, 2016 International Preliminary Report on Patentability issued in International Patent Application No. PCT/JP2015/058901.
Oct. 27, 2017 Search Report issued in European Application No. 15770238.2.
Apr. 2, 2019 Office Action Issued in Malaysian Patent Application No. PI 2016001541.

* cited by examiner

*Primary Examiner* — Tahseen Khan
(74) *Attorney, Agent, or Firm* — Oliff PLC

(57) ABSTRACT

A dip-formed article obtained by dip forming a dip-forming composition containing a latex of a carboxyl group-containing nitrile rubber, wherein at least one surface is surface treated, a thickness is 0.02 to 0.2 mm, a coefficient of dynamic friction of the surface treated surface is 0.5 or less, and a tensile strength after surface treatment is 30 MPa or more is provided.

9 Claims, No Drawings

DIP-FORMED ARTICLE AND METHOD OF PRODUCTION OF DIP-FORMED ARTICLE

TECHNICAL FIELD

The present invention relates to a dip-formed article, more particularly relates to a dip-formed article excellent in put-on and strip-off ability due to a reduction in coefficient of dynamic friction by surface treatment and kept down in drop in tensile strength due to surface treatment and a method of producing such a dip-formed article.

BACKGROUND ART

In the past, it has been known to dip-form a dip-forming composition which contains a natural latex such as a latex of natural rubber to obtain a dip-formed article used in contact with the human body such as a nipple, balloon, glove, medical balloon, and sack. However, a latex of natural rubber contains proteins which cause allergic reactions in the human body, so sometimes there was a problem as a dip-formed article which directly contacts the mucous membrane or organs of the body. Therefore, studies have been made on the use of a latex of a synthetic nitrile rubber.

For example, Patent Document 1 discloses a latex composition containing a carboxyl group-containing conjugated diene-based rubber latex and an amphoteric surfactant comprised of a weak base and strong acid and a dip-formed article obtained by dip-forming this latex composition. Further, the above Patent Document 1 discloses the art of using a sodium hypochlorite aqueous solution to treat the surface of the obtained dip-formed article. The surface treatment using such a sodium hypochlorite aqueous solution is usually performed so as to improve the put-on and strip-off ability of the dip-formed article, but on the other hand, when using a sodium hypochlorite aqueous solution for surface treatment as in the above Patent Document 1, chlorine ends up penetrating to the inside of the dip-formed article, so chlorine addition reaction ends up being occurred not only at the outer surface, but also up to the inside and therefore there was the problem that the tensile strength ended up falling.

PRIOR ART DOCUMENTS

Patent Documents

Patent Document 1: Japanese Patent Publication No. 2004-300386A

SUMMARY OF INVENTION

Problem to be Solved by the Invention

The present invention has as its object the provision of a dip-formed article excellent in put-on and strip-off ability due to a reduction in coefficient of dynamic friction by surface treatment and kept down in drop in tensile strength due to surface treatment and a method of producing such a dip-formed article.

Means for Solving the Problems

The present inventors engaged in intensive research to solve the above problem and as a result discovered that it is possible to achieve the above object, in a dip-formed article obtained by dip-forming a dip-forming composition containing a latex of a carboxyl group-containing nitrile rubber and treated on one surface by surface treatment, by making the thickness of the dip-formed article, the coefficient of dynamic friction of the surface treated surface, and the tensile strength after surface treatment in the predetermined ranges and thereby completed the present invention.

That is, according to the present invention, there is provided a dip-formed article obtained by dip forming a dip-forming composition containing a latex of a carboxyl group-containing nitrile rubber, wherein at least one surface is surface treated, a thickness is 0.02 to 0.2 mm, a coefficient of dynamic friction of the surface treated surface is 0.5 or less, and a tensile strength after surface treatment is 30 MPa or more.

The dip-formed article of the present invention preferably has an elongation at break after surface treatment of 500% or more.

Also, the dip-formed article of the present invention preferably has a rate of change of tensile strength before surface treatment and after surface treatment of less than 20%.

Further, in the dip-formed article of the present invention, preferably the surface treatment is performed using an organohalogenating agent, while more preferably the organohalogenating agent is trichloroisocyanuric acid.

The dip-formed article of the present invention is preferably a glove.

Also, according to the present invention, there is provided a dip-formed article obtained by dip-forming a dip-forming composition containing a latex of a carboxyl group-containing nitrile rubber, wherein at least one surface is surface treated using an organohalogenating agent.

Further, according to the present invention, there is provided a method of production of a dip-formed article comprising a step of dip-forming a dip-forming composition containing a latex of a carboxyl group-containing nitrile rubber so as to form a dip-formed layer and a step of surface treating at least one surface of the dip-formed layer using an organohalogenating agent.

Effects of Invention

According to the present invention, it is possible to provide a dip-formed article excellent in put-on and strip-off ability due to a reduction in coefficient of dynamic friction by surface treatment and kept down in drop in tensile strength due to surface treatment and a method of producing such a dip-formed article.

DESCRIPTION OF EMBODIMENTS

The dip-formed article of the present invention is a dip-formed article obtained by dip-forming a dip-forming composition containing a latex of a carboxyl group-containing nitrile rubber, wherein at least one surface is surface treated, a thickness is 0.02 to 0.2 mm, a coefficient of dynamic friction of the surface treated surface is 0.5 or less, and a tensile strength after surface treatment is 30 MPa or more.

First, the dip-forming composition used for obtaining the dip-formed article of the present invention will be explained.

Dip-Forming Composition

The dip-forming composition used in the present invention contains at least a latex of the carboxyl group-containing nitrile rubber.

Latex of Carboxyl Group-Containing Nitrile Rubber

The latex of the carboxyl group-containing nitrile rubber used in the present invention is a latex of a nitrile rubber obtained by copolymerizing a conjugated diene monomer, ethylenically unsaturated nitrile monomer, ethylenically unsaturated carboxylic acid monomer, and, used when necessary, another ethylenically unsaturated monomer copolymerizable with the same.

As the conjugated diene, for example, 1,3-butadiene, isoprene, 2,3-dimethyl-1,3-butadiene, 2-ethyl-1,3-butadiene, 1,3-pentadiene, chloroprene, etc. may be mentioned. Among these as well, 1,3-butadiene and isoprene are preferable, while 1,3-butadiene is more preferable. These conjugated diene monomer may be used alone or as two types or more combined. The amount of use of the conjugated diene monomer is preferably 30 to 89 parts by weight with respect to 100 parts by weight of the total monomers used for polymerization, more preferably 40 to 84 parts by weight, still more preferably 50 to 78 parts by weight. If the amount of use of the conjugated diene monomer is too small, the obtained dip-formed article tends to become inferior in feel, while conversely if too great, the tensile strength tends to become inferior.

As the ethylenically unsaturated nitrile monomer, for example, acrylonitrile, methacrylonitrile, fumaronitrile, α-chloroacrylonitrile, α-cyanoethylacrylonitrile, etc. may be mentioned. Among these as well, acrylonitrile and methacrylonitrile are preferable, while acrylonitrile is more preferable. These ethylenically unsaturated nitrile monomer may be used alone or as two types or more combined. The amount of use of the ethylenically unsaturated nitrile monomer is preferably 10 to 50 parts by weight with respect to 100 parts by weight of the total monomers used for the polymerization, more preferably 15 to 45 parts by weight, still more preferably 20 to 40 parts by weight. If the amount of use of the ethylenically unsaturated nitrile monomer is too small, the obtained dip-formed article tends to become inferior in tensile strength, while conversely if too great, the feeling tends to become inferior.

As the ethylenically unsaturated carboxylic acid monomer, for example, an ethylenically unsaturated monocarboxylic acid monomer such as acrylic acid and methacrylic acid; an ethylenically unsaturated polyvalent carboxylic acid monomer such as itaconic acid, maleic acid, and fumaric acid; an ethylenically unsaturated polyvalent carboxylic acid partial ester monomer such as monobutyl fumarate, monobutyl maleate, and mono-2-hydroxypropyl maleate; and also a monomer generating a carboxyl group by hydrolysis such as an ethylenically unsaturated polyvalent carboxylic acid anhydride such as maleic anhydride and citraconic anhydride; etc. may be mentioned. Among these as well, an ethylenically unsaturated monocarboxylic acid monomer is preferable, an ethylenically unsaturated monocarboxylic acid monomer having 3 to 10 carbon atoms is more preferable, and methacrylic acid is particularly preferable. These ethylenically unsaturated carboxylic acid monomers may be used alone or as two types or more combined. The amount of use of the ethylenically unsaturated carboxylic acid monomer is preferably 1 to 20 parts by weight with respect to 100 parts by weight of the total monomers used for the polymerization, more preferably 1 to 15 parts by weight, still more preferably 2 to 10 parts by weight. If the amount of use of the ethylenically unsaturated carboxylic acid monomer is too small, the obtained dip-formed article tends to become inferior in tensile strength, while conversely if too large, the feeling tends to become inferior.

As the copolymerizable other ethylenically unsaturated monomer, for example, a vinyl aromatic monomer such as styrene, alkyl styrene, and vinyl naphthalene; a fluoroalkyl vinyl ether such as fluoroethylvinyl ether; an ethylenically unsaturated amide monomer such as (meth)acrylamide, N-methylol(meth)acrylamide, N, N-dimethylol(meth)acrylamide, N-methoxymethyl(meth)acrylamide, and N-propoxymethyl(meth)acrylamide; an ethylenically unsaturated carboxylic acid ester monomer such as methyl (meth)acrylate, ethyl (meth)acrylate, butyl (meth)acrylate, 2-ethylhexyl (meth)acrylate, trifluoroethyl (meth)acrylate, tetrafluoropropyl (meth)acrylate, dibutyl maleate, dibutyl fumarate, diethyl maleate, methoxymethyl (meth)acrylate, ethoxyethyl (meth)acrylate, methoxyethoxyethyl (meth)acrylate, cyanomethyl (meth)acrylate, 2-cyanoethyl (meth)acrylate, 1-cyanopropyl (meth)acrylate, 2-ethyl-6-cyanohexyl (meth)acrylate, 3-cyanopropyl (meth)acrylate, hydroxyethyl (meth)acrylate, hydroxypropyl (meth)acrylate, glycidyl (meth)acrylate, and dimethylaminoethyl (meth)acrylate; cross-linkable monomers such as divinylbenzene, polyethyleneglycol di(meth)acrylate, polypropyleneglycol di(meth)acrylate, trimethylolpropane tri(meth)acrylate, and pentaerythritol (meth)acrylate; etc. may be mentioned. These copolymerizable other ethylenically unsaturated monomers can be used alone or as two types or more combined.

The amount of use of the copolymerizable other ethylenically unsaturated monomer is 20 parts by weight or less with respect to 100 parts by weight of the total monomers used for the polymerization, preferably 15 parts by weight or less, more preferably 10 parts by weight or less. If the amount of use of the copolymerizable other ethylenically unsaturated monomer is too great, the obtained dip-formed article tends to become inferior in feeling.

The latex of the carboxyl group-containing nitrile rubber used in the present invention is obtained by copolymerizing the monomer mixture containing the above-mentioned monomers, the method of copolymerization using emulsion polymerization is preferable. As the emulsion polymerization method, a conventional known method can be employed.

When emulsion polymerizing a monomer mixture containing the above-mentioned monomers, usually used polymerization secondary materials such as an emulsifier, polymerization initiator, and molecular weight adjuster can be used. The method of addition of these polymerization secondary materials is not particularly limited. Any method such as the initial single-shot addition method, batch addition method, continuous addition method, etc. may be used.

The emulsifier is not particularly limited, but, for example, a nonionic emulsifier such as a polyoxyethylene alkyl ether, polyoxyethylene alkyl phenol ether, polyoxyethylene alkyl ester, and polyoxyethylene sorbitan alkyl ester; an anionic emulsifier such as an alkylbenzene sulfonic acid salt such as potassium dodecylbenzene sulfonate and sodium dodecylbenzene sulfonate, a higher alcohol sulfuric acid ester salt, and an alkyl sulfosuccinic acid salt; a cationic emulsifier such as an alkyl trimethylammonium chloride, dialkylannionium chloride, and benzylammonium chloride; a copolymerizable emulsifier such as a sulfo ester of an α,β-unsaturated carboxylic acid, a sulfate ester of an α,β-unsaturated carboxylic acid, and a sulfoalkylaryl ether; etc. may be mentioned. Among these as well, an anionic emulsifier is preferable, an alkylbenzene sulfonic acid salt is more preferable, and potassium dodecylbenzene sulfonate and sodium dodecylbenzene sulfate are particularly preferable. These emulsifiers may be used alone or as two types or more combined. The amount of the emulsifier used is preferably 0.1 to 10 parts by weight with respect to 100 parts by weight of the monomer mixture.

The polymerization initiator is not particularly limited, but an inorganic peroxide such as sodium persulfate, potassium persulfate, ammonium persulfate, potassium perphosphate, and hydrogen perchlorate; an organic peroxide such as diisopropylbenzene hydroperoxide, cumen hydroperoxide, t-butyl hydroperoxide, 1,1,3,3-tetramethylbutyl hydroperoxide, 2,5-dimethylhexane-2,5-dihydroperoxide, di-t-butyl peroxide, di-α-cumyl peroxide, acetyl peroxide, isobutyryl peroxide, and benzoyl peroxide; an azo compound such as azobisisobutyronitrile, azobis-2,4-dimethylvaleronitrile, and methylazobis isobutyrate; etc. may be mentioned. These polymerization initiators may be used alone as two or more types combined.

Note that, the peroxide initiator is preferably used, because, by using the peroxide initiator, stable production of a latex can be achieved and a dip-formed article with a strong mechanical strength and soft feeling can be obtained. The amount of use of the polymerization initiator is preferably 0.01 to 10 parts by weight with respect to 100 parts by weight of the monomer mixture, more preferably 0.01 to 2 parts by weight.

Further, the peroxide initiator may be used in combination with a reducing agent as a redox type polymerization initiator. This reducing agent is not particularly limited, but a compound containing metal ion in a reduced state such as ferrous sulfate and copper naphthenate; a sulfonic acid compound such as sodium methane sulfonate; an amine compound such as dimethyl aniline; etc. may be mentioned. These reducing agents may be used alone or as two types or more combined. The amount of use of the reducing agent is preferably 3 to 1000 parts by weight with respect to 100 parts by weight of the peroxide.

The amount of water used at the time of emulsion polymerization is preferably 80 to 600 parts by weight with respect to 100 parts by weight of the total monomers which are used, particularly preferably 100 to 200 parts by weight.

As the method of adding the monomers, for example, the method of adding the monomers which are used into the reaction container all at once, the method of adding them continuously or intermittently in accordance with the progress in the polymerization, the method of adding part of the monomers to cause them to react until a specific conversion rate, then adding the remains of the monomer continuously or intermittently for polymerization etc. may be mentioned. Any of these methods can be employed. When mixing the monomers and adding them continuously or intermittently, the composition of the mixture may be made constant or may be made to change. Further, the monomers may be added to the reaction container after premixing the monomers which are used or may be added to the reaction container separately.

Further, in accordance with need, a polymerization secondary material such as a chelating agent, dispersant, pH adjuster, deoxidant, and particle size adjuster may be used. These are not particularly limited in type or amount of use.

The polymerization temperature at the time of emulsion polymerization is not particularly limited, but is usually 5 to 95° C., preferably 30 to 70° C. The polymerization time is 5 to 40 hours or so.

In the above way, the monomer mixture is emulsion polymerized. When reaching a predetermined polymerization conversion rate, the polymerization system is cooled or a polymerization terminator is added to stop the polymerization reaction. The polymerization conversion rate when stopping the polymerization reaction is preferably 90 wt % or more, more preferably 93 wt % or more.

The polymerization terminator is not particularly limited, but, for example, hydroxylamine, hydroxylamine sulfate, diethylhydroxylamine, hydroxylamine sulfonic acid and its alkali metal salts, sodium dimethyldithiocarbamate, hydroquinone derivatives, catechol derivatives, and aromatic hydroxydithiocarboxylic acid and their alkali metal salts such as hydroxydimethylbenzene thiocarboxylic acid, hydroxydiethylbenzene dithiocarboxylic acid, and hydroxydibutylbenzene dithiocarboxylic acid and their alkali metal salts etc. may be mentioned. The amount of use of the polymerization terminator is preferably 0.05 to 2 parts by weight with respect to 100 parts by weight of the monomer mixture.

After terminating the polymerization reaction, as desired, it is possible to remove the unreacted monomers and adjust the solid content concentration and pH so thereby obtain a latex of the carboxyl group-containing nitrile rubber.

Further, to the latex of the carboxyl group-containing nitrile rubber used in the present invention, if needed, an antiaging agent, preservative, antibacterial agent, dispersant, etc. may be suitably added.

The latex of the carboxyl group-containing nitrile rubber used in the present invention has a number average particle size of preferably 60 to 300 nm, more preferably 80 to 150 nm. The particle size can be adjusted to a desired value by a method such as adjusting the amounts of use of the emulsifier and polymerization initiator.

Cross-Linking Agent

Further, the dip-forming composition used in the present invention preferably contains a cross-linking agent in addition to the latex of the carboxyl group-containing nitrile rubber.

As the cross-linking agent, one which is usually used in dip-forming can be used. For example, sulfurs such as powdered sulfur, flowers of sulfur, precipitated sulfur, colloidal sulfur, surface treated sulfur, and insoluble sulfur; polyamines such as hexamethylene diamine, triethylene tetramine, and tetraethylene pentamine; etc. may be mentioned. Among these as well, sulfur is preferable. In the dip-forming composition of the present invention, the amount of the cross-linking agent is preferably 0.5 to 10 parts by weight with respect to 100 parts by weight of the solid content of the latex of the carboxyl group-containing nitrile rubber, more preferably 0.5 to 5 parts by weight.

Other Compounding Agents

Further, in the dip-forming composition used in the present invention, in addition to the above-mentioned latex of the carboxyl group-containing nitrile rubber and the optionally used cross-linking agent, as desired, a cross-linking aid, cross-linking accelerator, filler, pH adjuster, thickener, antiaging agent, dispersant, pigment, softener, etc. may be included.

As the cross-linking aid, one usually used in dip-forming may be used. For example, zinc oxide, stearic acid, a zinc salt of stearic acid, etc. may be mentioned. Among these as well, zinc oxide is preferable. These cross-linking aids may be used alone or as two types or more combined. The amount of the cross-linking aid is preferably 0.5 to 10 parts by weight with respect to 100 parts by weight of the solid content of the latex of the carboxyl group-containing nitrile rubber, more preferably 0.5 to 5 parts by weight.

As the cross-linking accelerator, one usually used in dip-forming can be used. For example, dithiocarbamic acids such as diethyldithiocarbamic acid, dibutyldithiocarbamic acid, di-2-ethylhexyldithiocarbamic acid, dicyclohexyldithiocarbamic acid, diphenyldithiocarbamic acid, and dibenzyldithiocarbamic acid and their zinc salts; 2-mercaptobenzothiazole, zinc 2-mercaptobenzothiazole, 2-mercaptothiazoline, dibenzothiazyl disulfide, 2-(2,4-dinitrophenylthio)benzothiazole, 2-(N,N-diethylthio-carbarylthio)benzothiazole, 2-(2,6-dimethyl-4-morpholinothio)benzothiazole, 2-(4'-morpholino-dithio)benzothiazole, 4-morphonyl-2-benzothiazyl-disulfide, 1,3-bis(2-benzothiazyl-mercaptomethyl)urea, etc. may be mentioned. Among these as well, zinc dibutyldithiocarbamate, 2-mercaptobenzothiazole, and zinc 2-mercaptobenzothiazole are preferable, while zinc dibutyldithiocarbamate is particularly preferable. These cross-linking accelerators may be used alone or as two types or more combined. The amount of the cross-linking accelerator is preferably 0.1 to 5 parts by weight with respect to 100 parts by weight of the solid content of the latex of the carboxyl group-containing nitrile rubber, more preferably 0.2 to 2 parts by weight.

The dip-forming composition used in the present invention has a solid content concentration of preferably 10 to 40 wt %, more preferably 15 to 35 wt %. Further, the dip-forming composition used in the present invention has a pH of preferably 8.5 to 12, more preferably 9 to 11.

Dip-Formed Article

The dip-formed article of the present invention is obtained by dip-forming the above dip-forming composition, then surface treating at least one side.

The dip-formed article of the present invention has a thickness of 0.02 to 0.2 mm, preferably 0.03 to 0.15 mm, more preferably 0.04 to 0.1 mm. If the thickness is too thin, the strength and the durability at the time of being worn when made into a glove become inferior, while if too thick, the operability and feeling at the time of being worn when made into a glove become inferior.

Further, the dip-formed article of the present invention has a coefficient of dynamic friction of the surface treated surface and tensile strength after surface treatment within the following ranges. By making these the following ranges, it is possible to make the put-on and strip-off ability excellent due to the reduction in the coefficient of dynamic friction by surface treatment and possible to keep down drop in tensile strength due to the surface treatment.

That is, the dip-formed article of the present invention has a coefficient of dynamic friction of the surface treated surface of 0.5 or less, preferably 0.4 or less, more preferably 0.3 or less. Note that, the lower limit of the coefficient of dynamic friction is not particularly limited, but is preferably 0.02 or more. If the coefficient of dynamic friction of the surface treated surface is too high, the put-on and strip-off ability ends up becoming poor.

Further, the dip-formed article of the present invention has a tensile strength after surface treatment of 30 MPa or more, preferably 32 MPa or more. Note that, the upper limit of the tensile strength after surface treatment is not particularly limited, but is preferably 200 MPa or less. If the tensile strength after surface treatment is too low, the article ends up easily breaking, so this is not preferable. Note that, the tensile strength can, for example, be found by measuring the tensile strength at the time of break when conducting a tensile test under conditions of a tensile speed of 500 mm/min.

Furthermore, the dip-formed article of the present invention has a rate of change of tensile strength before surface treatment and after surface treatment of preferably less than 20%, more preferably less than 15%, still more preferably less than 10%. Note that, the lower limit of the rate of change of the tensile strength is not particularly limited, but is preferably 0.5% or more. If the rate of change of tensile strength before surface treatment and after surface treatment is too large, the drop in strength due to the surface treatment is large and the durability ends up becoming inferior. Note that, the rate of change of the tensile strength can be obtained by measuring the tensile strength of the dip-formed article which has been surface treated and the tensile strength of the dip-formed article which has not been surface treated and calculating the following formula based on these. Note that, the tensile strength can, for example, be found by measuring the tensile strength at break when performing a tensile test under conditions of a tensile speed of 500 mm/min.

Rate of change of tensile strength (%)={(tensile strength of dip-formed article not surface treated)−(tensile strength of dip-formed article after surface treatment)}/(tensile strength of dip-formed article not surface treated)×100.

Further, the dip-formed article of the present invention preferably not only has a coefficient of dynamic friction of the surface treated surface, a tensile strength after surface treatment, and a rate of change of the tensile strength before surface treatment and after surface treatment in these ranges, but also an elongation at break after surface treatment of 500% or more, more preferably 550% or more, still more preferably 580% or more. Note that, the upper limit of the elongation at break is not particularly limited, but is preferably 1300% or less. By making the elongation at break the above range, it is possible to further improve the put-on and strip-off ability and feeling when made into a glove. Note that, the elongation at break can, for example, be found by measuring the elongation at break at the time of a tensile test under conditions of tensile speed of 500 mm/min.

As the dip-forming method for obtaining the dip-formed article of the present invention, a usual method may be employed. For example, the direct dipping method, anode coagulant dipping method, and teague coagulant dipping method may be mentioned. Among these as well, from the viewpoint of the ease of obtaining a dip-formed article having a uniform thickness, the anode coagulant dipping method is preferable.

In the case of the anode coagulant dipping method, for example, the mold for dip-forming is dipped in the coagulant solution to deposit a coagulant on the mold surface, then dip this in a dip-forming composition to form a dip-formed layer on the mandrel surface.

The coagulant is not particularly limited, but in the present invention, polyvalent metal salt is preferably used. The polyvalent metal salt is not particularly limited, but a polyvalent metal halide such as barium chloride, calcium chloride, magnesium chloride, zinc chloride, and aluminum chloride; a polyvalent metal nitrate such as barium nitrate, calcium nitrate, and zinc nitrate; a polyvalent metal acetate such as barium acetate, calcium acetate, and zinc acetate; a polyvalent metal sulfate such as calcium sulfate, magnesium sulfate, and aluminum sulfate; etc. may be mentioned. Among these as well, since the effect of the present invention becomes more remarkable, a polyvalent metal salt in which a polyvalent metal is calcium is preferable, calcium chloride and calcium nitrate are more preferable, and calcium nitrate is particularly preferred.

The coagulant is preferably used in the state of an aqueous solution. This aqueous solution may further contain a water soluble organic solvent such as methanol and ethanol or a nonionic surfactant. The concentration of the coagulant is normally 5 to 70 wt %, preferably 10 to 50 wt %.

The obtained dip-formed layer is usually heat treated so as to be cross-linked. Before heat treatment, it may be dipped in water, preferably 30 to 70° C. warm water, for 1 to 60 minutes, to remove the water soluble impurities (for example, excess emulsifier, coagulant, etc.). The operation for removing the water soluble impurities may be performed after heat treating the dip-formed layer, but from the viewpoint of more efficiently removing the water soluble impurities, performing it before heat treatment is preferable.

The dip-formed layer is usually cross-linked by heat treatment at 100 to 150° C. preferably for 10 to 120 minutes. As the method of heating, the method of outside heating by infrared rays or hot air or the method of inside heating by high frequency can be employed. Among these as well, outside heating by hot air is preferable.

Next, at least one surface of the obtained dip-formed layer, preferably the surface positioned at the front surface (surface opposite to surface contacting mold for dip-forming) is surface treated. The surface treatment method at this time is not particularly limited, but the method of dipping the obtained dip-formed layer in a surface treatment solution is preferable. As the surface treatment solution, from the viewpoint of keeping down the drop in tensile strength of the obtained dip-formed article while enabling a reduction of the coefficient of dynamic friction of the surface treated surface and of making the dip-formed article obtained by this excellent in put-on and strip-off ability, use of a surface treatment agent comprised of an organohalogenating agent is preferable, while use of a solution of this dissolved in a solvent (surface treatment solution) is more preferable.

The organohalogenating agent used as the surface treatment agent is not particularly limited, but it may be an organic compound acting as a halogenating agent. For example, halogenated isocyanuric acids such as trichloroisocyanuric acid, dichloroisocyanuric acid, tribromoisocyanuric acid, and dibromoisocyanuric acid; halogenated succinimides such as N-chlorosuccinimide and N-bromosuccinimide; halogenated hydantoins such as 1,3-dichloro-5,5-dimethyl hydantoin and 1,3-dibromo-5,5-dimethyl hydantoin; halogenated succinimides such as N-chlorosuccinimide and N-bromosuccinimide; halogenated Meldrum's acids such as 5,5-dichloro Meldrum's acid and 5,5-dibromo Meldrum's acid; hexachloroacetone; etc. may be mentioned. Among these as well, from the viewpoint of the high effect of suppression of a drop in tensile strength of the obtained dip-formed article, a halogenated isocyanuric acid is preferable, while trichloroisocyanuric acid is more preferable. These organohalogenating agents can respectively be used alone or as two types or more combined.

The solvent for dissolving the surface treatment agent is not particularly limited so long as a solvent able to dissolve a surface treatment agent, but, for example, water; a linear ketone such as acetone, methylethylketone (2-butanone), cyclopentanone, 2-hexanone, 3-hexanone, 2-heptanone, 3-heptanone, 4-heptanone, 2-octanone, 3-octanone, and 4-octanone; alcohols such as methyl alcohol, ethyl alcohol, n-propyl alcohol, isopropyl alcohol, n-butyl alcohol, and cyclohexanol; esters such as propyl formate, butyl formate, propyl acetate, butyl acetate, methyl propionate, ethyl propionate, methyl butyrate, ethyl butyrate, methyl lactate, and ethyl lactate; etc. may be mentioned. Among these as well, from the viewpoint of the solubility of the surface treatment agent being excellent and removal after surface treatment being easy, a linear ketone is preferable, while acetone is more preferable. These solvents can respectively be used alone or as two types or more combined.

The concentration of the surface treatment agent in the surface treatment solution is a halogen element concentration (concentration of halogen atoms in surface treatment solution) of preferably 500 to 5000 weight ppm, more preferably 800 to 4000 weight ppm. Further, the dipping time when dipping the obtained dip-formed layer in the surface treatment solution is preferably 20 to 300 seconds, more preferably 30 to 240 seconds, still more preferably 60 to 180 seconds.

Note that, the temperature of the surface treatment solution at the time of surface treatment is preferably 5 to 60° C., more preferably 10 to 40° C.

The dip-formed layer is dipped in the surface treatment solution, then is dried to remove the solvent. The drying temperature is preferably 20 to 80° C., while the drying time is preferably 10 seconds to 60 minutes, more preferably 1 to 20 minutes. Further, after drying to remove the solvent, the layer may be rinsed with water in accordance with need. For example, flowing water may be used for rinsing for 1 to 20 minutes. Furthermore, after rinsing, drying at 40 to 100° C. for 1 to 30 minutes is preferable.

Further, by peeling off the surface treated dip-formed layer from the mold for dip-forming, a dip-formed article is obtained. As the peeling method, the method of peeling it off from the mold by hand or peeling it off by water pressure or the pressure of compressed air may be employed. Note that, after being peeled off, the article may be further heat treated at 60 to 120° C. in temperature for 10 to 120 minutes. Further, after being peeled off from the mold for dip-forming, the other surface (surface contacting mold for dip-forming) may also be surface treated in the same way as above.

Such a dip-formed article of the present invention is excellent in put-on and strip-off ability due to the reduction in the coefficient of dynamic friction by surface treatment and is kept down in drop in tensile strength due to surface treatment, so can be suitably used for applications where attachment and detachment are sought, specifically glove applications, in particular thin surgical gloves. Alternatively, the dip-formed article of the present invention can be used, not only for gloves, but also for nipples for nursing bottles, droppers, tubes, water pillows, balloon sacks, catheters, condoms, and other medical products; toys such as balloons, dolls, and balls; industrial products such as bags for press forming and bags for gas storage; fingerstalls; etc.

EXAMPLES

Below, the present invention will be explained by more detailed examples, but the present invention is not limited to these examples. Note that, below, "parts" is based on weight unless otherwise indicated. Further, the tests and evaluations were as follows.

Coefficient of Dynamic Friction

The coefficient of dynamic friction was measured based on ASTM D-1894 using a surface property measuring device (product name "HEIDON-14D", made by Shinto Scientific Co., Ltd.). Specifically, a test piece cut from the palm part of the surface treated dip-formed article (glove) (in Comparative Example 1, non-surface treated dip-formed article) was attached to a moving weight in a state with the surface treated surface at the front surface, the moving weight with the test piece attached was run on a stainless steel plate by a 150 mm/min speed under conditions of a movement distance of 130 mm, then the running resistance caused by the friction of the test piece (coefficient of dynamic friction) was measured. Below, the measurement conditions etc. are shown.

contact area of test piece: 63.5 mm×63.5 mm weight of moving weight: 200 g formula for calculation of coefficient of dynamic friction μ': μ'=C/D(C=average load (g) after running becoming even speed, D=weight of moving weight (g))

Tensile Strength and Elongation at Break

From the obtained surface treated dip-formed article (glove) (in Comparative Example 1, a non-surface treated dip-formed article), in accordance with ASTM D-412, a dumbbell (Die-C) was used to prepare a dumbbell shaped test piece. Next, this test piece was stretched by a tensile speed of 500 mm/min using a product name "3343 type tensile tester" (made by Instron) and measured for tensile strength at break (MPa) and elongation at break (%).

Rate of Change of Tensile Strength

The rate of change of the tensile strength was found in accordance with the following formula based on the tensile strength at the time of break measured in the same way as above for the obtained surface treated dip-formed article (glove) (in Comparative Example 1, non-surface treated dip-formed article) and the tensile strength at the time of break measured in the same way as above for the non-surface treated dip-formed article obtained at Comparative Example 1. The smaller the rate of change of the tensile strength, the smaller the deterioration due to surface treatment and the better the durability that can be judged.

Rate of change of tensile strength (%)={(tensile strength of non-surface treated dip-formed article of Comparative Example 1)−(tensile strength of surface treated dip-formed article)}/(tensile strength of non-surface treated dip-formed article of Comparative Example 1)×100.

Put-On and Strip-Off Ability

The inside of a surface treated dip-formed article (glove) (in Comparative Example 1, non-surface treated dip-formed article) was filled with water, then the water was discharged. In the state wet with water, the glove was put on. The difficulty when then stripping it off was evaluated by the following criteria.

Excellent: Extremely easy to put on and strip off.

Good: Easy to put on and strip off.

Poor: Difficult to put on and strip off.

PRODUCTION EXAMPLE 1

Production of Latex of Carboxyl Group-Containing Nitrile Rubber (a)

A pressure resistant polymerization reactor was charged with 29 parts of acrylonitrile, 5.5 parts of methacrylic acid, 0.5 part of t-dodecyl mercaptan as a molecular weight adjuster, 150 parts of deionized water, and 2.5 parts of sodium dodecyl benzene sulfonate, the gas at the inside was replaced with nitrogen three times, then 65.5 parts of 1,3-butadiene was charged. Next, 0.2 part of potassium persulfate and 0.1 part of sodium ethylenediamine tetraacetate were charged, then the system temperature was made 39° C. to start the polymerization reaction. The polymerization reaction was continued until the polymerization conversion rate reached 97%, then 0.1 part of diethylhydroxylamine was added to stop the polymerization reaction. Further, the unreacted monomers were distilled off in vacuo from the obtained copolymer latex, then a solid concentration and pH were adjusted to obtain a latex of a carboxyl group-containing nitrile rubber (a) with a solid content concentration of 43% and a pH8.5.

EXAMPLE 1

Preparation of Dip-Forming Composition

To 232.5 parts of the latex of the obtained carboxyl group-containing nitrile rubber (a) obtained in Production Example 1 (100 parts converted to carboxyl group-containing nitrile rubber (a)), aqueous solutions of the different compounding agents were added to give, converted to solid content, 1 part of sulfur (cross-linking agent), 1 part of potassium oleate (fatty acid soap and/or resin acid soap), 0.5 part of zinc dibutyldithiocarbamate (cross-linking accelerator), 1.5 parts of zinc oxide (cross-linking aid), and 1.5 parts of titanium oxide (pigment), then a potassium hydroxide aqueous solution was added to obtain a dip-forming composition adjusted to pH9.8 (solid content concentration: 25 wt %).

Production of Surface Treated Dip-Formed Article

A glove mold made of ceramic roughened on its surface was washed, preheated in a 70° C. oven, then was dipped in a 25° C. aqueous solution of a coagulant comprised of 13 wt % of calcium sulfate and 0.05 wt % of polyoxyethylene lauryl ether (product name "Emulgen 109P", made by Kao Corporation) for 5 seconds, then taken out.

Next, the glove mold coated by a coagulant was dried in a 70° C. oven. After that, the glove mold coated by the coagulant was taken out from the oven, was dipped in the above obtained dip-forming composition (adjusted to 25° C.) for 10 seconds, then taken out and dried at room temperature for 60 minutes to thereby obtain a glove mold covered with a dip-formed layer. Further, the glove mold covered by this dip-formed layer was dipped in 60° C. warm water for 2 minutes, then was dried at room temperature for 30 minutes. After that, the glove mold covered by the dip-formed layer was placed in a 120° C. oven and cross-linked for 20 minutes to thereby obtain a glove mold covered by a cross-linked dip-formed layer.

Further, the cross-linked dip-formed layer was surface treated by dipping it in an acetone solution of trichloroisocyanuric acid adjusted to a chlorine concentration of 1000 weight ppm at 25° C. for 90 seconds. After that, the it was dried at room temperature for 5 minutes, then washed by running water for 5 minutes, placed in a 70° C. oven, and dried for 10 minutes. Next, a glove mold coated with the surface treated dip-formed layer was cooled until room temperature then the layer was stripped off from the glove mold to thereby obtain a surface treated dip-formed article (glove). The obtained surface treated dip-formed article had a thickness of 0.06 mm.

Then, the obtained surface treated dip-formed article was used to measure the coefficient of dynamic friction, tensile strength, elongation at break, rate of change of tensile strength, and put-on and strip-off ability. The results are shown in Table 1.

EXAMPLE 2

Except for using as the surface treatment solution, instead of an acetone solution of trichloroisocyanuric acid with a chlorine concentration of 1000 weight ppm, an aqueous solution of trichloroisocyanuric acid with a chlorine concentration of 1500 weight ppm, the same procedure was followed as in Example 1 to obtain a surface treated dip-formed article and the same procedure was followed to evaluate it. Note that, the obtained surface treated dip-formed article had a thickness of 0.06 mm. The results are shown in Table 1.

EXAMPLE 3

Except for using as the surface treatment solution, instead of an acetone solution of trichloroisocyanuric acid with a chlorine concentration of 1000 weight ppm, an aqueous solution of trichloroisocyanuric acid with a chlorine concentration of 3000 weight ppm, the same procedure was followed as in Example 1 to obtain a surface treated dip-formed article and the same procedure was followed to evaluate it. Note that, the obtained surface treated dip-formed article had a thickness of 0.06 mm. The results are shown in Table 1.

EXAMPLE 4

Except for changing the time of dipping in the surface treatment solution for the surface treatment from 90 seconds to 60 seconds, the same procedure was followed as in Example 2 to obtain a surface treated dip-formed article and the same procedure was followed to evaluate it. Note that, the obtained surface treated dip-formed article had a thickness of 0.06 Inn. The results are shown in Table 1.

EXAMPLE 5

Except for changing the time of dipping in the surface treatment solution for the surface treatment from 90 seconds to 120 seconds, the same procedure was followed as in Example 2 to obtain a surface treated dip-formed article and the same procedure was followed to evaluate it. Note that, the obtained surface treated dip-formed article had a thickness of 0.06 MI. The results are shown in Table 1.

COMPARATIVE EXAMPLE 1

Except for not performing surface treatment, the same procedure was followed as in Example 1 to obtain a non-surface treated dip-formed article and the same procedure was followed to evaluate it. Note that, the obtained non-surface treated dip-formed article had a thickness of 0.06 mm. The results are shown in Table 1.

COMPARATIVE EXAMPLE 2

Except for using as the surface treatment solution, instead of an acetone solution of trichloroisocyanuric acid with a chlorine concentration of 1000 weight ppm, an aqueous solution of sodium hypochlorite with a chlorine concentration of 100 weight ppm, the same procedure was followed as in Example 1 to obtain a surface treated dip-formed article and the same procedure was followed to evaluate it. Note that, the obtained surface treated dip-formed article had a thickness of 0.06 mm. The results are shown in Table 1.

COMPARATIVE EXAMPLE 3

Except for using as the surface treatment solution, instead of an acetone solution of trichloroisocyanuric acid with a chlorine concentration of 1000 weight ppm, an aqueous solution of sodium hypochlorite with a chlorine concentration of 1500 weight ppm, the same procedure was followed as in Example 1 to obtain a surface treated dip-formed article and the same procedure was followed to evaluate it. Note that, the obtained surface treated dip-formed article had a thickness of 0.06 mm. The results are shown in Table 1.

COMPARATIVE EXAMPLE 4

Except for using as the surface treatment solution, instead of an acetone solution of trichloroisocyanuric acid with a chlorine concentration of 1000 weight ppm, an aqueous solution of sodium hypochlorite with a chlorine concentration of 3000 weight ppm, the same procedure was followed as in Example 1 to obtain a surface treated dip-formed article and the same procedure was followed to evaluate it. Note that, the obtained surface treated dip-formed article had a thickness of 0.06 mm. The results are shown in Table 1.

TABLE 1

| | Example | | | | | Comparative Example | | | |
|---|---|---|---|---|---|---|---|---|---|
| | 1 | 2 | 3 | 4 | 5 | 1 | 2 | 3 | 4 |
| Surface treatment condition | | | | | | | | | |
| Type of surface treatment agent | Trichloroisocyanuric acid | | | | | No surfaces treatment | Sodium hypochlorite | | |
| Concentration of surface treatment agent (chlorine concentration) (weight ppm) | 1000 | 1500 | 3000 | 1500 | 1500 | | 100 | 1500 | 3000 |
| Surface treatment time (sec) | 90 | 90 | 90 | 60 | 120 | | 90 | 90 | 90 |
| Evaluation of surface treated dip-formed article | | | | | | | | | |
| Thickness (mm) | 0.06 | 0.06 | 0.06 | 0.06 | 0.06 | 0.06 | 0.06 | 0.06 | 0.06 |
| Coefficient of dynamic friction | 0.28 | 0.22 | 0.17 | 0.25 | 0.15 | 0.67 | 0.62 | 0.24 | 0.16 |
| Elongation at break (%) | 626 | 593 | 597 | 601 | 594 | 631 | 573 | 527 | 494 |
| Tensile strength (MPa) | 36.82 | 34.42 | 32.3 | 35.07 | 33.56 | 37.98 | 35.9 | 29.2 | 25.4 |
| Rate of change of tensile strength (%) | 3.1 | 9.4 | 15.0 | 7.7 | 1.6 | 0 | 5.5 | 23.1 | 33.1 |
| Put-on and Strip-off ability | Good | Good | Excellent | Good | Good | Poor | Poor | Good | Excellent |

As shown in Table 1, a surface treated dip-formed article obtained by surface treatment using an organic halogenating agent (trichloroisocyanuric acid) has a thickness, coefficient of dynamic friction of a surface treated surface, and tensile strength after surface treatment within the ranges of the present invention, is excellent in put-on and strip-off ability, further, is kept low in rate of change of tensile strength, and therefore is excellent (Examples 1 to 5).

On the other hand, when not surface treated, the obtained dip-formed article was large in coefficient of dynamic friction and poor in put-on and strip-off ability (Comparative Example 1).

Further, when using a surface treatment solution comprised of an aqueous solution of sodium hypochlorite with a chlorine concentration of 100 weight ppm, the obtained surface treated dip-formed article was insufficient in surface treatment, the coefficient of dynamic friction was large, and the put-on and strip-off ability was poor (Comparative Example 2).

Furthermore, when using a surface treatment solution comprised of an aqueous solution of sodium hypochlorite with a chlorine concentration of 1500 weight ppm and 3000 weight ppm respectively, the obtained surface treated dip-formed article fell in tensile strength due to surface treatment by a large amount and was poor in durability (Comparative Examples 3 and 4).

The invention claimed is:

1. A dip-formed article obtained by dip forming a dip-forming composition containing a latex, where each latex contained in the dip-forming composition that is used to obtain the dip-formed article is a rubber latex that is selected from the group consisting of latexes of a carboxyl group-containing nitrile rubber,
    wherein
        the dip-formed article is a glove, and
        at least one surface is surface treated, a thickness is 0.02 to 0.2 mm, a coefficient of dynamic friction of the surface treated surface is 0.5 or less, and a tensile strength after surface treatment is 30 MPa or more.

2. The dip-formed article according to claim 1, wherein an elongation at break after surface treatment is 500% or more.

3. The dip-formed article according to claim 1, wherein a rate of change of tensile strength before surface treatment and after surface treatment is less than 20%.

4. The dip-formed article according to claim 1, wherein the surface treatment is performed using an organohalogenating agent.

5. The dip-formed article according to claim 1, wherein the organohalogenating agent is trichloroisocyanuric acid.

6. The dip-formed article according to claim 1, wherein the glove exhibits improved put-on and strip-off ability compared to an otherwise identical glove that was not treated by the surface treatment.

7. A dip-formed article obtained by dip forming a dip-forming composition containing a latex, where each latex contained in the dip-forming composition that is used to obtain the dip-formed article is a rubber latex that is selected from the group consisting of latexes of a carboxyl group-containing nitrile rubber,
    wherein
        the dip-formed article is a glove,
        at least one surface is surface treated using a solution of an organohalogenating agent dissolved in a solvent, and
        the halogen element concentration of the solution is 500 to 5000 weight ppm and the dipping time when dipping the surface in the solution is 20 to 300 seconds.

8. The dip-formed article according to claim 7, wherein the organohalogenating agent is trichloroisocyanuric acid.

9. A method of production of the dip-formed article according to claim 7, the method comprising:
    dip-forming a dip-forming composition containing a latex so as to form a dip-formed layer, wherein each latex contained in the dip-forming composition that is used to form any dip-formed layer is a rubber latex that is selected from the group consisting of latexes of a carboxyl group-containing nitrile rubber; and
    surface treating at least one surface of the dip-formed layer using a solution of an organohalogenating agent dissolved in a solvent, wherein
        the halogen element concentration of the solution is 500 to 5000 weight ppm and the dipping time when dipping the surface in the solution is 20 to 300 seconds.

* * * * *